(12) United States Patent
Magpuri et al.

(10) Patent No.: US 11,850,509 B2
(45) Date of Patent: Dec. 26, 2023

(54) INTERACTIVE THEATER SYSTEM WITH REAL-TIME FEEDBACK AND DYNAMIC SPECIAL EFFECTS

(71) Applicant: Falcon's Beyond Brands, LLC, Orlando, FL (US)

(72) Inventors: Cecil D. Magpuri, Orlando, FL (US); Syed Saham Ali, Orlando, FL (US); David Consolo, Orlando, FL (US)

(73) Assignee: Falcon's Beyond Brands, LLC, Orlando, FL (US)

( * ) Notice: Subject to any disclaimer, the term of this patent is extended or adjusted under 35 U.S.C. 154(b) by 0 days.

(21) Appl. No.: 17/672,276

(22) Filed: Feb. 15, 2022

(65) Prior Publication Data

US 2022/0258044 A1    Aug. 18, 2022

Related U.S. Application Data

(60) Provisional application No. 63/150,414, filed on Feb. 17, 2021.

(51) Int. Cl.
*A63F 13/428* (2014.01)
*A63F 13/213* (2014.01)
(Continued)

(52) U.S. Cl.
CPC .......... *A63F 13/428* (2014.09); *A63F 13/213* (2014.09); *A63F 13/27* (2014.09);
(Continued)

(58) Field of Classification Search
CPC ...... A63F 13/428; A63F 13/213; A63F 13/27; A63F 13/28; A63F 13/285; A63F 13/847;
(Continued)

(56) References Cited

U.S. PATENT DOCUMENTS

| 4,192,507 A | 3/1980 | Rains et al. |
| 4,771,344 A | 9/1988 | Fallacaro et al. |

(Continued)

FOREIGN PATENT DOCUMENTS

| CN | 202169097 U | 3/2012 |
| CN | 104307190 A | 1/2015 |

(Continued)

*Primary Examiner* — William H McCulloch, Jr.
(74) *Attorney, Agent, or Firm* — KATTEN MUCHIN ROSENMAN LLP (57) ABSTRACT

The interactive theater system is executed on an interactive gaming computer (IG PC) configured to execute an interactive multi-player video game. The IG PC outputs a video stream to a display system, such as a projector and screen, which allows the players to view the multi-player video game. Each player sits in a multi-sensory seat for providing multi-sensory feedback to each player during execution of the interactive multi-player video game. The player provides input using an input device having an infrared camera and motion sensors. The infrared camera is used to image an infrared light arrangement positioned above-the multi-sensory seats. Infrared camera data and motion sensor data is used by the IG PC to accurately determine the real time position of each input device. Players in a first interactive theater system can compete with players in a second interactive theater system in real time.

13 Claims, 10 Drawing Sheets

(51) Int. Cl.
*A63F 13/285* (2014.01)
*A63F 13/27* (2014.01)
*A63G 31/16* (2006.01)
*A63F 13/847* (2014.01)

(52) U.S. Cl.
CPC .......... *A63F 13/285* (2014.09); *A63F 13/847* (2014.09); *A63G 31/16* (2013.01); *A63F 2300/1087* (2013.01); *A63F 2300/302* (2013.01); *A63F 2300/8023* (2013.01)

(58) Field of Classification Search
CPC ........ A63F 2300/1087; A63F 2300/302; A63F 2300/8023; A63G 31/16; A63J 5/00; A63J 5/025; A63J 5/04; A63J 25/00; A63J 2005/005; A63J 2005/002; A63J 2005/003
See application file for complete search history.

(56) References Cited

U.S. PATENT DOCUMENTS

| | | | |
|---|---|---|---|
| 5,973,672 A | 10/1999 | Rice et al. | |
| 6,220,965 B1 * | 4/2001 | Hanna | A63G 7/00 463/52 |
| 6,257,982 B1 * | 7/2001 | Rider | A63F 13/79 463/31 |
| 6,848,219 B2 * | 2/2005 | Standard | E04H 3/22 472/75 |
| 7,278,920 B1 * | 10/2007 | Klamer | A63F 13/30 463/31 |
| 7,364,508 B2 * | 4/2008 | Loose | G07F 17/3227 463/30 |
| 7,934,773 B2 | 5/2011 | Boulais et al. | |
| 8,172,677 B2 * | 5/2012 | Bleich | G07F 17/3216 463/30 |
| 8,206,230 B2 * | 6/2012 | Magpuri | G03B 21/606 472/60 |
| 8,475,275 B2 * | 7/2013 | Weston | A63J 21/00 463/31 |
| 8,702,515 B2 * | 4/2014 | Weston | A63F 13/30 463/39 |
| 8,814,688 B2 * | 8/2014 | Barney | A63F 13/95 463/40 |
| 8,827,810 B2 * | 9/2014 | Weston | A63F 13/822 463/39 |
| 8,926,441 B2 * | 1/2015 | Fox | E04H 3/30 472/75 |
| 8,992,336 B2 * | 3/2015 | Magpuri | A63G 31/14 472/60 |
| 9,442,361 B2 * | 9/2016 | Kim | H04N 21/47 |
| 9,540,832 B2 * | 1/2017 | Magpuri | A63J 25/00 |
| 9,684,369 B2 * | 6/2017 | Huang | G06F 3/011 |
| 9,764,232 B2 * | 9/2017 | Park | A63F 13/28 |
| 9,931,566 B2 * | 4/2018 | Harris | A63J 11/00 |
| 10,360,713 B1 * | 7/2019 | Arana | G06T 11/60 |
| 10,369,463 B2 * | 8/2019 | Barney | A63F 13/327 |
| 10,406,448 B2 * | 9/2019 | Vyas | B25J 9/1615 |
| 10,440,455 B2 * | 10/2019 | Fox | G10K 11/17823 |
| 10,478,719 B2 * | 11/2019 | Weston | A63F 13/30 |
| 10,481,679 B2 | 11/2019 | Sevostianov | |
| 10,713,831 B2 * | 7/2020 | Arana | G06T 11/60 |
| 10,857,467 B2 * | 12/2020 | Magpuri | A63F 13/245 |
| 2003/0216185 A1 * | 11/2003 | Varley | A63F 13/30 463/42 |
| 2005/0039210 A1 | 2/2005 | Dusenberry et al. | |
| 2006/0068917 A1 * | 3/2006 | Snoddy | F16H 3/728 463/42 |
| 2010/0079585 A1 * | 4/2010 | Nemeth | H04N 13/337 348/E13.001 |
| 2010/0300006 A1 * | 12/2010 | Magpuri | G03B 37/00 52/80.1 |
| 2012/0247030 A1 * | 10/2012 | Magpuri | G03B 37/00 52/6 |
| 2013/0064427 A1 | 3/2013 | Picard et al. | |
| 2014/0062881 A1 | 3/2014 | Solomon et al. | |
| 2014/0277771 A1 * | 9/2014 | Park | G05B 13/02 700/279 |
| 2014/0342831 A1 * | 11/2014 | Weston | A63J 21/00 463/39 |
| 2014/0378233 A1 * | 12/2014 | Weston | A63F 13/245 463/42 |
| 2015/0286275 A1 * | 10/2015 | Huang | A63F 13/843 345/156 |
| 2016/0279511 A1 * | 9/2016 | Miller | A63F 13/27 |
| 2018/0155944 A1 * | 6/2018 | Gorny | G03B 21/56 |
| 2019/0336864 A1 * | 11/2019 | Magpuri | A63F 13/69 |
| 2020/0125031 A1 * | 4/2020 | Weston | G02B 27/18 |
| 2020/0298133 A1 * | 9/2020 | Magpuri | A63G 33/00 |
| 2021/0339127 A1 * | 11/2021 | Ito | G06F 8/38 |
| 2022/0057864 A1 * | 2/2022 | Ito | A63F 13/50 |
| 2022/0258044 A1 * | 8/2022 | Magpuri | A63G 31/16 |
| 2022/0339536 A1 * | 10/2022 | Dobrikov | A63F 13/215 |
| 2023/0055456 A1 * | 2/2023 | Tehrani | C09D 11/037 |

FOREIGN PATENT DOCUMENTS

| | | |
|---|---|---|
| CN | 204193523 U | 3/2015 |
| EP | 2268025 A1 | 12/2010 |
| JP | 2007289384 A | 11/2007 |
| KR | 200362923 Y1 | 9/2004 |
| KR | 20150053285 A | 5/2015 |
| KR | 101755128 B1 | 7/2017 |

\* cited by examiner

| 4-SEAT UNIT SPECIFICATION | Max. Loading Capacity | 4 Persons / 360 kg in total |
| --- | --- | --- |
| | Row Seat Weight | 352 kg |
| | Dimensions [W/L/H] | 2380 x 782 x 1106 mm |
| | Use | Indoor |
| | Material of Seats | Synthetic leather, not flammable |
| | Operation Temperature | 5°C - 40°C |
| | Operation Humidity | < 70 % |
| | Heave [tilt up & down] | +/- 40 mm [seatdrop 80 mm] |
| | Roll [tilt side to side] | +/- 3.75° [7.5° in total] |
| | Pitch [forward & backward] | +/- 12° [24° in total] |
| | Sway [move right & left] | +/- 10 mm [20 mm in total] |
| | Period | > 0.15 sec |
| | Vibration Frequency | 5 - 250 Hz |
| | Acceleration Index Z-axis [Heave] | max. 1.35 g |
| | Acceleration Index X-axis [Pitch] | max. 1.32 g |
| | Acceleration Index Y-axis [Roll & Sway] | max. 1.35 g |
| FUNCTIONAL SPECIFICATION | In-seat Special Effects | Dual neck blast / Poke effect / Dual leg tickler / Seat vibration |
| | Additional Special Effects [in combination with SFX armrest] | Water spray / Face blast / Wind system [variable intensity] / Multi-scent system [optional] / Strobe flashlight / Face lights [RGB color mix] / Floor illumination [RGBA colormix] / Occupancy Sensor |

INTERACTIVE THEATER SYSTEM WITH REAL-TIME FEEDBACK AND DYNAMIC SPECIAL EFFECTS

CROSS-REFERENCE TO RELATED APPLICATIONS

This application claims priority to U.S. Provisional Application Ser. No. 63/150,414, filed Feb. 17, 2021, the entire contents of which are hereby incorporated by reference in their entirety.

FIELD OF THE INVENTION

The present invention is directed to an interactive theater system with real-time feedback and dynamic special effects. In particular, the present invention is directed to an interactive theater system in which each user is presented with personalized real-time feedback and control over the user's interaction with the displayed video image, such as a video game.

BACKGROUND

In recent years, video games have become exponentially more popular. Over two billion people currently play video games on phones, video game consoles, personal computers, tablets, etc. This number is expected to increase.

Electronic sports (eSports) and streaming platforms such as Twitch, Livestream, Mixer, etc., have also become increasingly popular. Video game users either compete against each other in person or stream their video game display over the internet to spectators. However, there is little to no interaction between the video game users and/or spectators other than messaging or audio chat. Spectators, in particular, are observers in a manner similar to attending traditional sporting events.

Therefore, there clearly exists a need for an interactive theater system which allows all users to be active participants which provides an engaging personalized experience while still retaining a feeling of group or team interaction.

SUMMARY

The interactive theater system of the present invention is primarily executed on an interactive gaming system (hereinafter referred to as an "IG PC") configured to execute an interactive multi-player video game. The IG PC outputs a video stream to a display system, such as a projector and screen, which allows the players to view the multi-player video game. Each player sits in a multi-sensory seat for providing multi-sensory feedback to each player during execution of the interactive multi-player video game. The player provides input using an input device having an infrared camera and motion sensors. The infrared camera is used to image an infrared light arrangement positioned above-the multi-sensory seats. Infrared camera data and motion sensor data is used by the IG PC to accurately determine the real time position of each input device.

DETAILED DESCRIPTION

Figure 1:
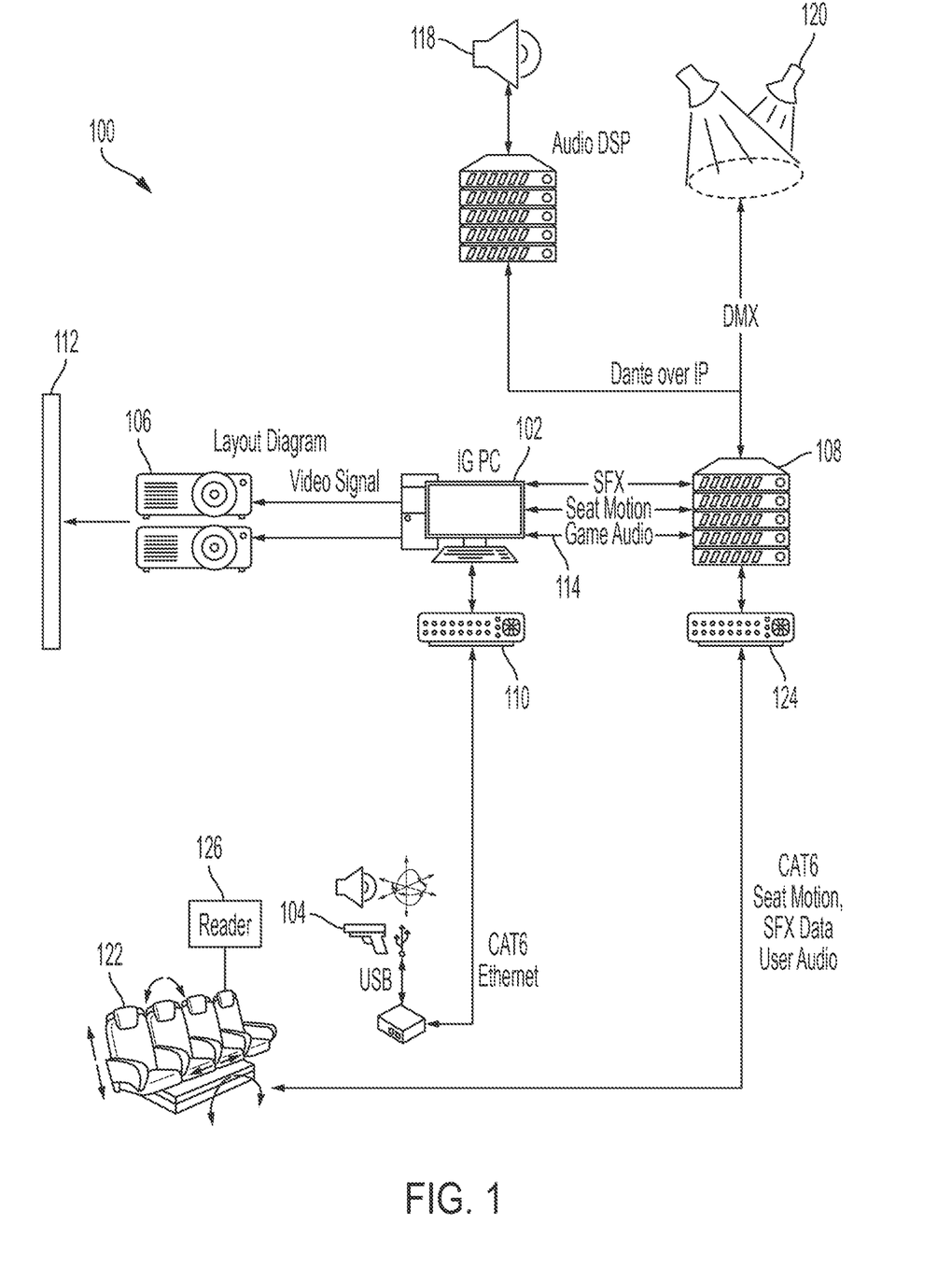
FIG. 1 depicts a schematic diagram of the core components of the interactive theater system.

FIG. 1 depicts a schematic diagram of interactive theater system 100. Interactive theater system 100 provides an interactive experience to users in which multiple participants can engage in simultaneous gameplay in a theater setting. Each user is provided with a multi-sensory seat 122 and one or more associated input devices 104. The input device(s) 104 allows the user to interact with immersive content on the display in real-time. The multi-sensory seats 122 comprise a variety of special effects that are customized for each user or grouping of users in response to the gameplay and the user's input from the input device 104.

IG PC 102 is responsible for receiving and processing all input from input devices 104, rendering video for projectors or displays 106, and outputting show control data to show controller 108. IG PC 102 may be one or more networked or connected computers or servers in accordance with the requirements and demands of the game currently being executed by interactive theater system 100.

Each projector 106 is preferably a pair of stereoscopic projectors which project two images onto one or more curved or flat projection screens 112. Each user is preferably provided with a pair of 3D glasses so that the display from the projectors can be viewed in 3D. However, it should be apparent to one of ordinary skill in the art that projectors 106 can also be video projectors similar to those utilized in movie theaters. In other embodiments, the video output from IG PC 102 can also be shown on one or more active display screens or devices, such as LCD or OLED displays, lenticular displays, light field displays and other autostereoscopic devices. In some embodiments, each user may be provided with an HMD which receives video data from IG PC 102.

Input is received from each user of the interactive theater system 100 via one or more input devices 104. Input device 104 preferably has a form factor allowing it to easily be held or manipulated by a user. Input device 104 can comprise any standard input controls known in the art such as buttons, triggers, directional pads, joysticks, gesture tracking systems, computer vision, tablets, audible inputs (e.g. microphones), etc.

Preferably, each input device 104 is coupled to IG PC 102 via a wired connection or a wireless connection. For example, as depicted in FIG. 1, each input device 104 may be coupled to IG PC 102 via input device switch 110 via an Ethernet connection. A wired connection may be preferable in instances when there are a large number of input devices 104. However, it should be apparent to one of ordinary skill in the art that other connection types (e.g., USB) or even wireless connections may be utilized.

In some embodiments, input device 104 may also receive effect data 114 from IG PC 102. For example, input device 104 may be provided with haptic feedback and/or a speaker to provide individualized effect data 114 to the user in response to their input on input device 104, actions displayed on screen 112, or input from other users in interactive theater system 100. Each screen 112 may be surrounded by decorations or modular panels which depict scenery related to the video game currently being played. For example, if the video game is a shooter set in outer space, the periphery of the screen may be decorated with modular panels having the look of a bridge. The outer periphery of the projector's displayed video could then be designed to blend seamlessly with the modular panels or other decorations. In particular, modular panels or removable decorations allow the theater 400 to easily be repurposed for other video games.

In other embodiments, a second screen may be utilized. The second screen may comprise additional panels, surfaces, flooring or ceiling as a display surface aside from screen 112. A static image, similar to the decoration shown on scenic elements, could then be projected onto the second screen and blended into the main game image shown on screen 112. This allows the viewing area to be increased without requiring constant rendering for the imagery shown on the second screen. In another embodiment, a simple animation (e.g., a looped video) or pre-rendered video could be displayed on the second screen. In another embodiment, the primary game content may be expanded to be displayed on the secondary screen.

IG PC 102 outputs effect data 114 to show controller 108 in synchronization with the video signal output to projectors 106. Effect data 114 may include, but is not limited to, environmental audio, individualized audio, sound effects, digital multiplex (DMX) data, seat control data, and user audio. The environmental audio is output from show controller 108 to an audio digital signal processor (DSP) 116. The audio DSP 116 processes the received environmental audio and outputs it to theater environmental audio system 118.

Theater environmental audio system 118 preferably comprises a plurality of speakers and subwoofers arranged to provide immersive audio and surround sound to the users of interactive theater system 100. The number of speakers and subwoofers and their layout in theater environmental audio system 118 is determined based on the theater configuration as is known in the art.

Show controller 108 outputs the DMX data to lighting system 120. Lighting system 120 may comprise any desired combination of known lighting types such as PAR lights, strip lights, strobe lights, spotlights, moving lights, etc. in accordance with the requirements of the game or program executed by interactive theater system 100 and the configuration of the theater.

Show controller 108 further outputs seat control data and user audio directly to each multi-sensory seat 122. As will be explained in more detail later, each multi-sensory seat 122 provides individualized sensory effects to each user based on their operation of their assigned input device 104, as well as the resultant output of the game to create an individualized and immersive experience for each user.

Each multi-sensory seat 122 is preferably coupled to the show controller 108 via seat switch 124 via an Ethernet connection (e.g., CAT 6). This allows a single cable to simultaneously carry the seat control data and the user audio.

Each multi-sensory seat 122 preferably comprises a reader 126 capable of recognizing a user. For example, the reader 126 may be a NFC reader or RFID reader capable of reading a tag carried by the user sitting in the multi-sensory seat 122 which can be used to identify the user.

Thus, interactive theater system 100 allows for a fully interactive real-time system that gives every user agency to direct the outcome of the action and even affect the narrative unfolding before them on a massive, cinema-style screen 112 with professional level audio and effects.

Preferably, each component of interactive theater system 100 is individually addressable so that control signals can be provided to each component individually. IG PC 102 is able to send separate control signals to projectors 106, input devices 104, theater environmental audio system 118, lighting system 120, and multi-sensory seats 122. The address for each component of interactive theater system 100 is maintained in a database by interactive theater system 100. This allows a programmer of the video game a high level of customization because individual control signals can be sent to each component. This also allows the various components of interactive theater system 100 to be grouped together and provided with grouped control signals in addition to individualized control signals. For example, a plurality of input devices 104 may be assigned a group such that the input devices receive the same haptic feedback in addition to individualized haptic feedback for each user.

This also allows interactive theater system 100 to group any components of interactive theater system 100 into groups of 1 (individual components) up until a group encompassing the every component (e.g., for the entire theater). The groupings can also be rearranged or reevaluated in real time. For example, if a particular user's character dies in a video game, another user in the theater (or another remote theater) may be added to the group. The developer of the video game can thus take advantage of the individual and group control of interactive theater system 100 to provide an experience not possible with other systems that do not have the ability to assign groupings to components.

Figure 2:
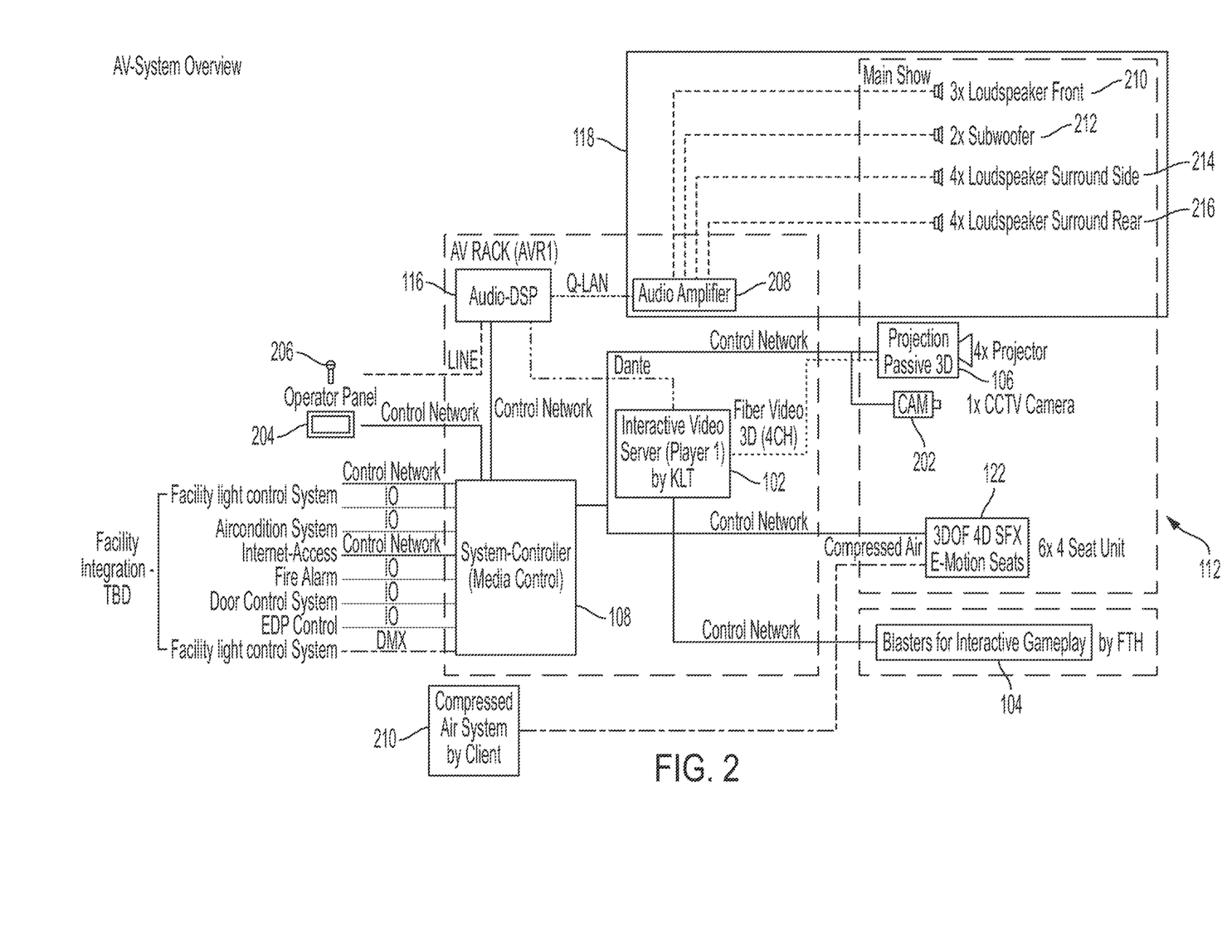
FIG. 2 depicts a schematic diagram of the audio-visual (AV) system of the interactive theater system.

Referring next to FIG. 2, depicted is a schematic diagram of the AV components of interactive theater system 100 in more detail. Interactive theater system 100 also comprises a variety of facility controls and monitoring tools. For example, each interactive theater system 100 preferably comprises one or more monitoring cameras 202 (e.g., CCTV) which allows for individual monitoring of the interactive theater system 100 via a control panel 204. An operator can provide audio to interactive theater system 100 via a microphone 206 which can be coupled to the theater environmental audio system 118. The microphone 206 can be used to provide the users with procedural instructions, evacuation instructions, warnings, or any other necessary information.

Control panel 204 can also be utilized to override or independently control lighting system 120 or theater environmental audio system 118 via show controller 108. Control panel 204 can also be utilized to control show door access, show action effects, e-stop, or any other systems of interactive theater system 100.

In the depicted embodiment, the audio DSP 116 processes the received audio signal and outputs it to theater environmental audio system 118. The signal for each audio component is preferably passed through audio amplifier 208 before being output to loudspeakers 210 (1X), subwoofers 212 (2X), side surround speakers 214 (4X), or rear surround speakers 216 (4X). As already explained, each audio component of interactive theater system 100 is individually addressable and separate control signals can be sent by IG PC 102 to any component of environmental audio system 118 in any grouping.

Each multi-sensory seat 122 may be coupled to a compressed air system 218 for providing a forced air effect to each seat (neck, legs, arms, etc.). Each multi-sensory seat 122 is capable of controlling the received compressed air in accordance with the effect data received from show controller 108. The effect data may be for system wide effects, effects for particular groupings of components, or for individual components.

Figure 3:
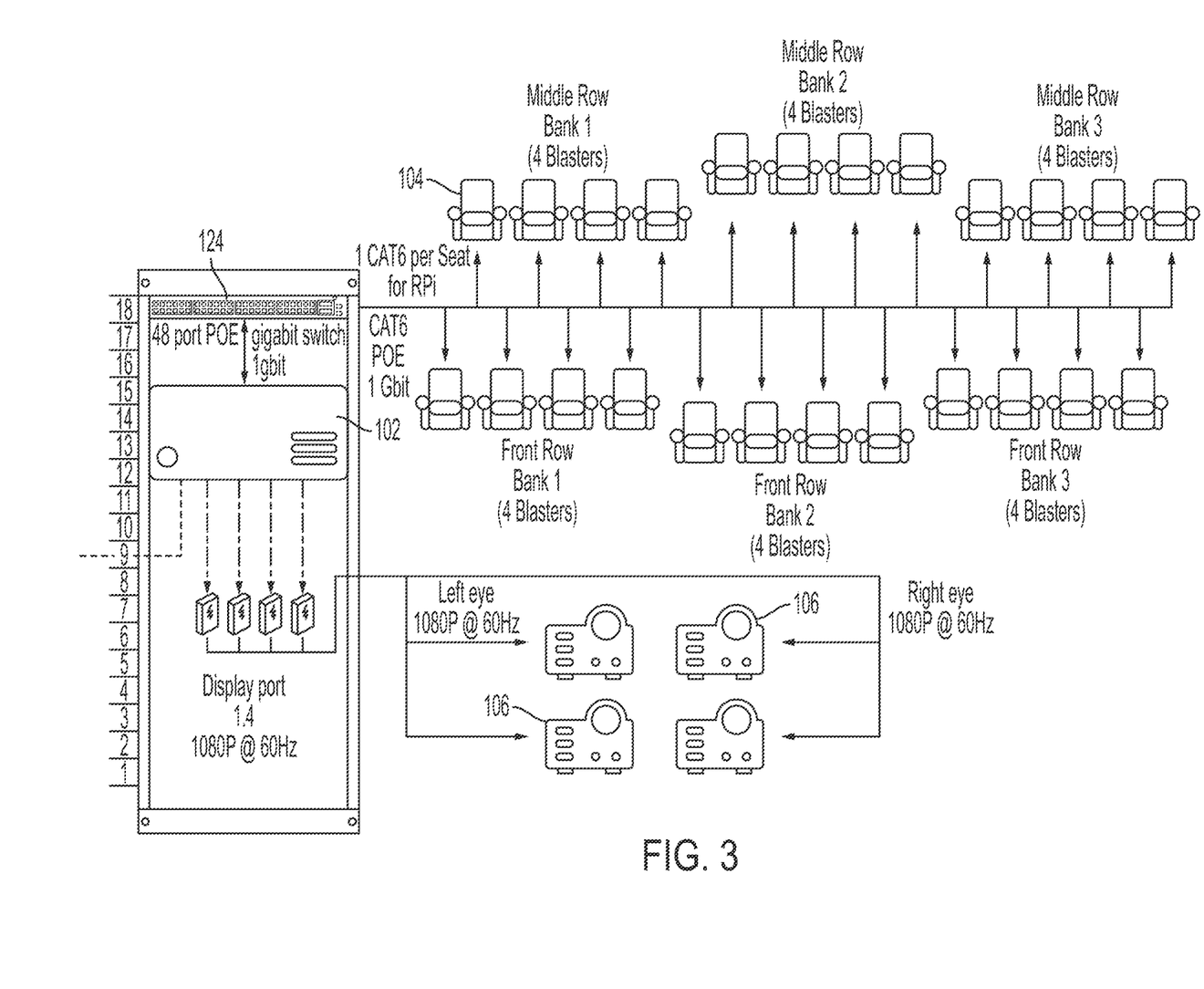
FIG. 3 depicts a schematic diagram of the interactive system of the interactive theater system.

FIG. 3 depicts a schematic diagram showing the interconnections between the IG PC 102, input devices 104, and projectors 106. Depicted in this embodiment are a total of 24 input devices 104 arranged into six banks, with four input devices 104 per bank. Each input device 104 is assigned to a single multi-sensory seat 122. As previously discussed, input devices 104 are coupled to seat switch 124 via USB over IP. The seat switch 124 is preferably a power over Ethernet (POE) gigabit switch to avoid having to run power lines to input devices 104. The video signal output to projectors 106 is preferably over Display port or similar output interfaces.

This figure illustrates example groupings that may be employed by interactive theater system 100. For example, the input devices 104 and multi-sensory seats 122 of bank 1 may be assigned a different group than that of bank 2. The users of bank 1 would receive effect data 114 that are for every seat and other event data 114 for each individual user of bank 1. The shared effect data 114 for bank 1 provides the users with a shared experience while still allowing for each input device 104 and multi-sensory seat 122 to be provided with additional customized feedback.

Figure 4:
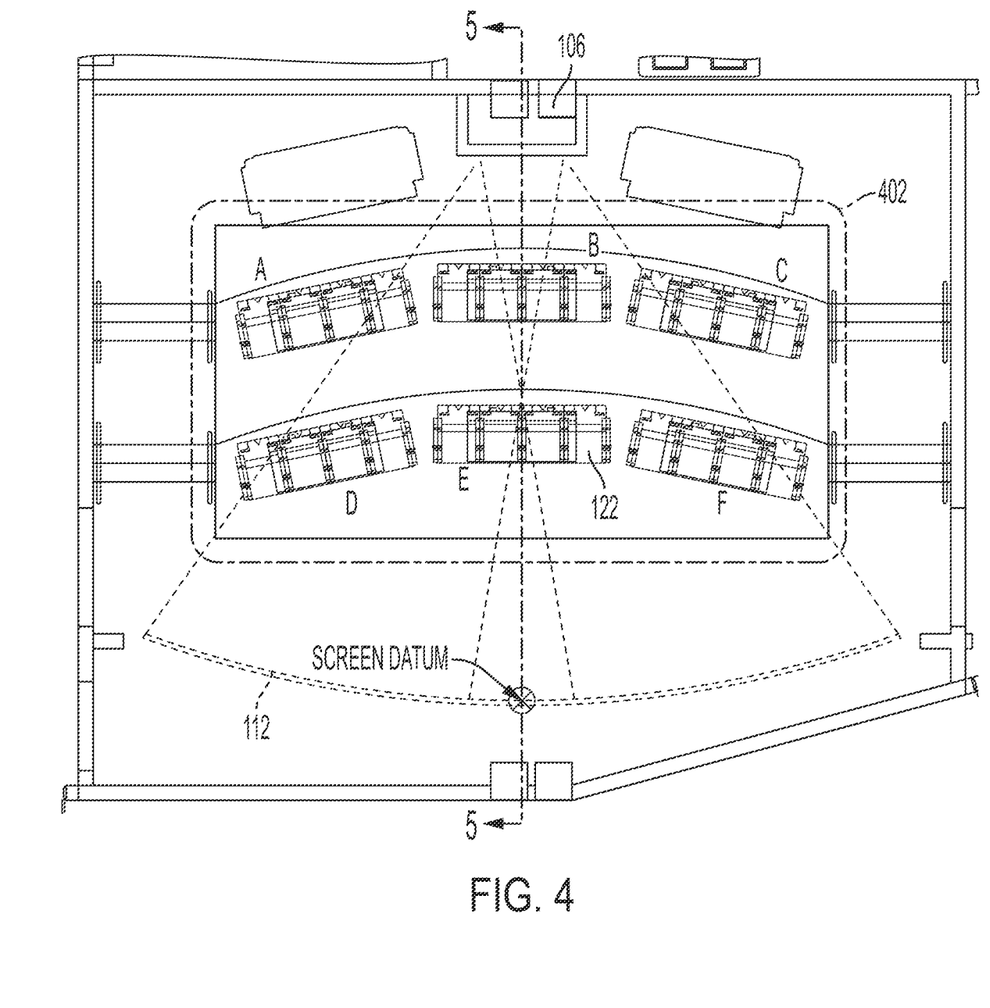
FIG. 4 depicts a layout view of an interactive theater according to an embodiment of the invention

FIG. 4 depicts an overhead view of a theater 400 outfitted with interactive theater system 100. As shown, projectors 106 are positioned at a rear-center of the theater 400 and a curved screen 112 is positioned at a front of the theater 300. In this embodiment, two sets of projectors 106 are employed to cover the entirety of screen 112. The output from each set of projectors 106 overlap at a center of the screen 112. The IG PC 102 is configured to output a corrected video signals so that this overlap is not detectable to the users and the screen 112 appears as a single, unified display.

The screen 112 may be curved or flat. In some embodiments, a plurality of curved screens 112 can be provided to form a partial or full hemisphere or dome display in the theater. In such embodiments, the arrangement of multi-sensory seats 122 could be arranged in an arc or circular configuration to take advantage of the increased display area (e.g., each bank could be assigned to a particular viewing region). In another embodiment, screens and multi-sensory seats can be arranged in an opposing configuration to provide versus, co-op and other gameplay styles.

Figure 5:
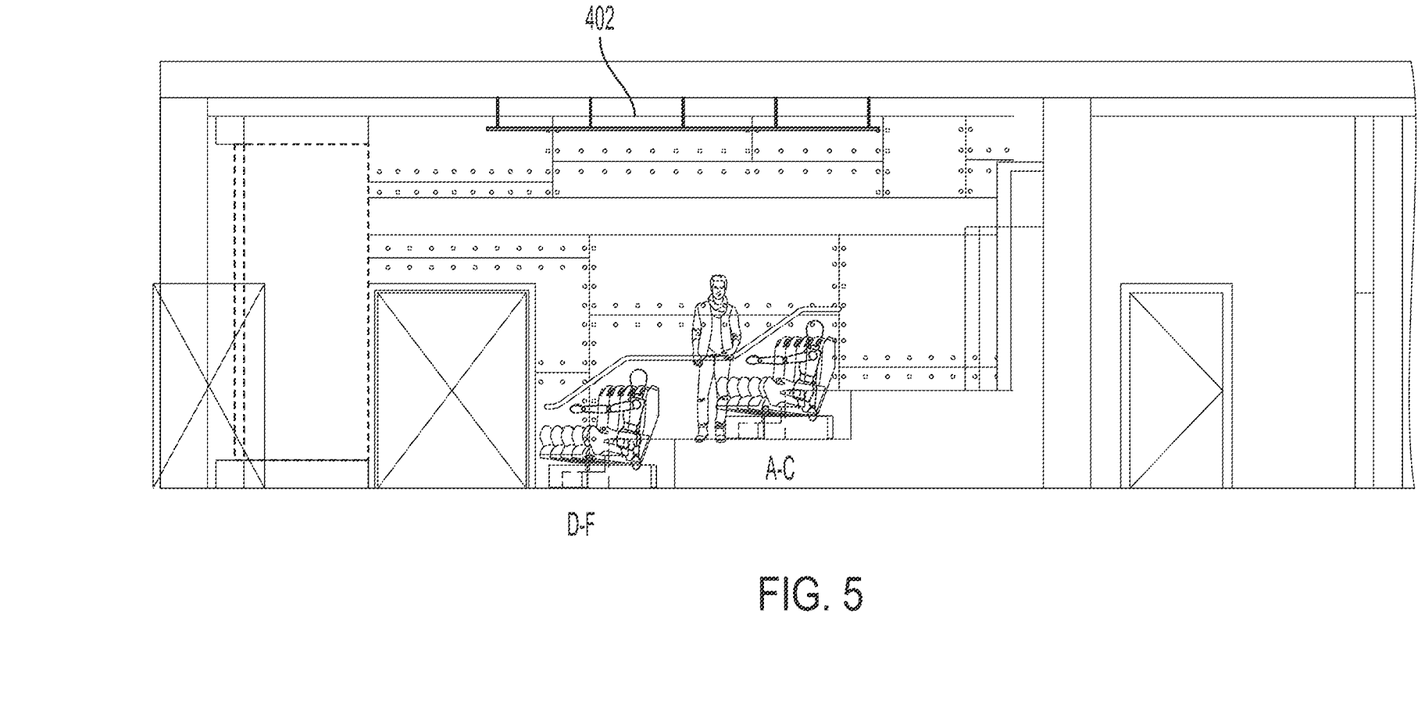
FIGS. 5-7 depict views of a sample tracking arrangement.

A plurality of multi-sensory seats 122 are arranged in banks A-F. Each multi-sensory seat 122 has one or more input device(s) 104. The rear set of banks A-C may be positioned higher than banks D-F so that each user has a clear and unobstructed view of screen 112 as depicted in FIG. 5. It should be obvious to one of ordinary skill in the art that the number of multi-sensory seats can easily be expanded into different tiers and configurations (e.g., 16 seat, 36 seats, etc.). It should be obvious to one of ordinary skill in the art that the number of input devices can easily be expanded.

Directly above the banks A-F is an arrangement of infrared (IR) lights 402 suspended from or integrated in the ceiling of theater 400. In some embodiments, each input device 104 comprises one or more infrared cameras configured to image the infrared light arrangement 402. The infrared camera data can then be used by IG PC 102 to pinpoint the exact spatial location of each input device 104 in the theater in real-time. Further, the received infrared camera data can also be used to identify the orientation of each input device 104, with or without additional positional information received from input device 104.

Other methods of tracking input devices 104 may also be employed. For example, an array of cameras (infrared or visible light) may be arranged throughout the theater and each input device 104 may comprise one or more markers. By imaging the markers on the input device 104, the location of each input device 104 can be tracked in real-time. Each input device 104 may further comprise a plurality of sensors such as an accelerometer, gyroscopic sensor, etc. which can be used to estimate the location of input devices 104 if one or more of the markers is temporarily occluded.

Figure 6:
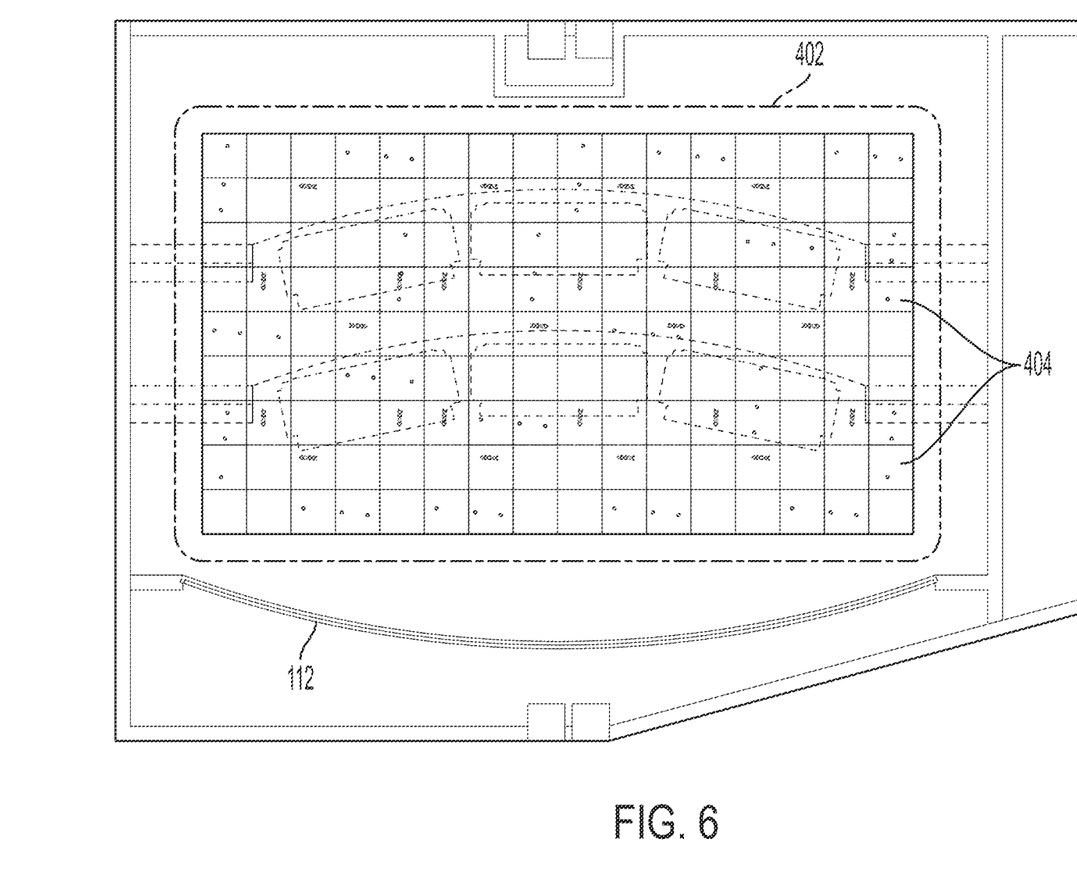
Figure 7:
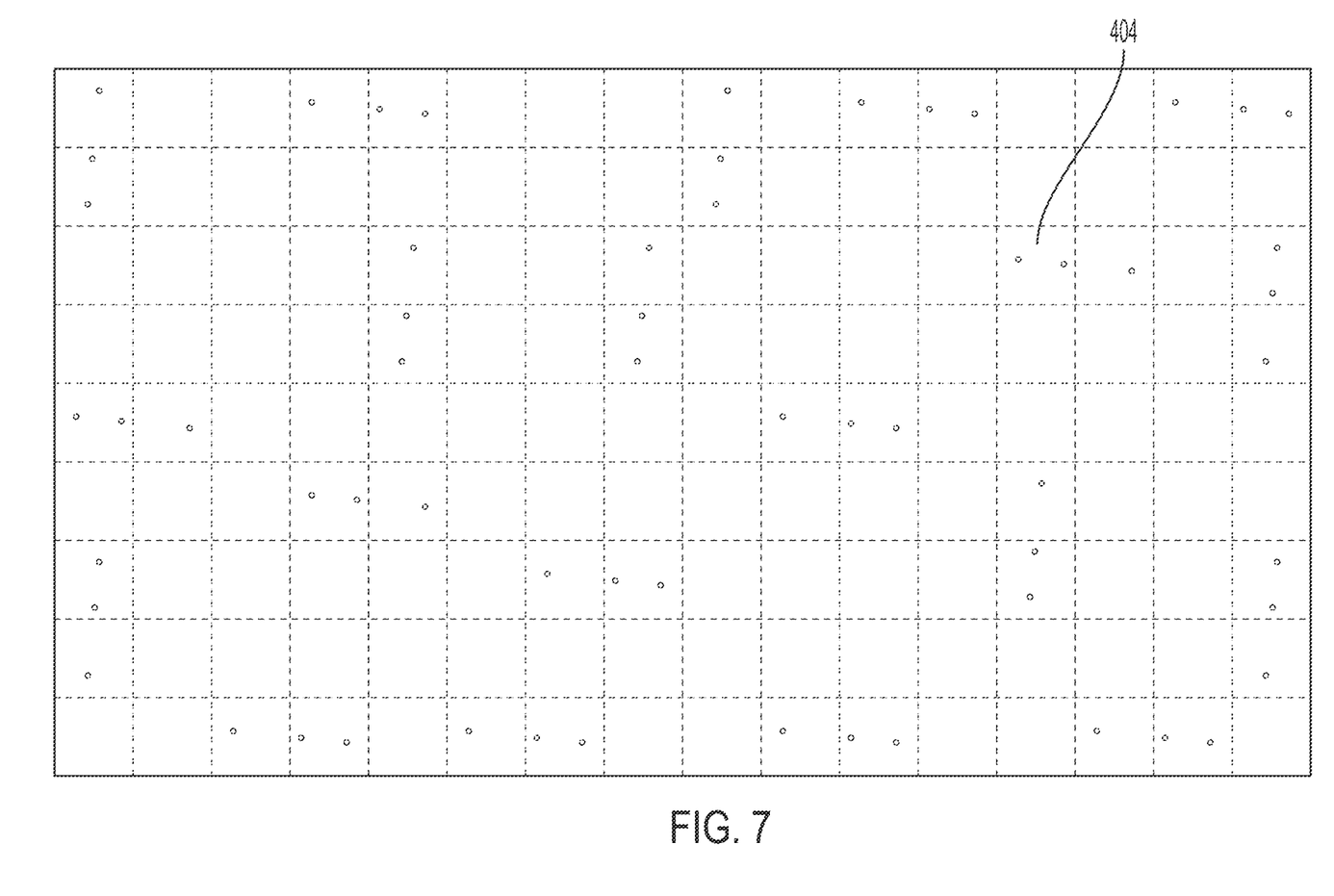

FIG. 6 depicts an overhead view of theater 400 with IR light arrangement 402 superimposed and FIG. 7 depicts IR light arrangement 402 in isolation for clarity. Each dot represents an individual IR light 404. The 60 depicted IR lights 404 are preferably arranged asymmetrically. An asymmetric pattern allows IG PC 102 to more quickly and easily triangulate and identify the position of each input device 104. Further, if the input device 104 is temporarily unable to image the IR light arrangement 402, the motion sensors in input device 104 can be used to provide interim position information for each input device if needed. Then, when the IR light arrangement 402 is visible again, the positioning information can seamlessly transition to again using the IR light arrangement 402 for position tracking.

Further, because the asymmetric pattern can easily be changed, each theater 400 can be assigned a unique asymmetric pattern if needed. This would aid in the identification of the theater 400 in environments where input devices 104 are wireless and potentially used in multiple theaters 400.

It should be obvious to one of ordinary skill in the art that any type of tracking system can be utilized in connection to interactive theater system 100 as long as it is able to provide the real-time location of the input devices 104 within the theater. This allows interactive theater system 100 to easily be upgraded as new tracking technologies are developed because interactive theater system 100 only requires the location of the input device 104 to function and to provide the appropriate feedback.

Figure 8:
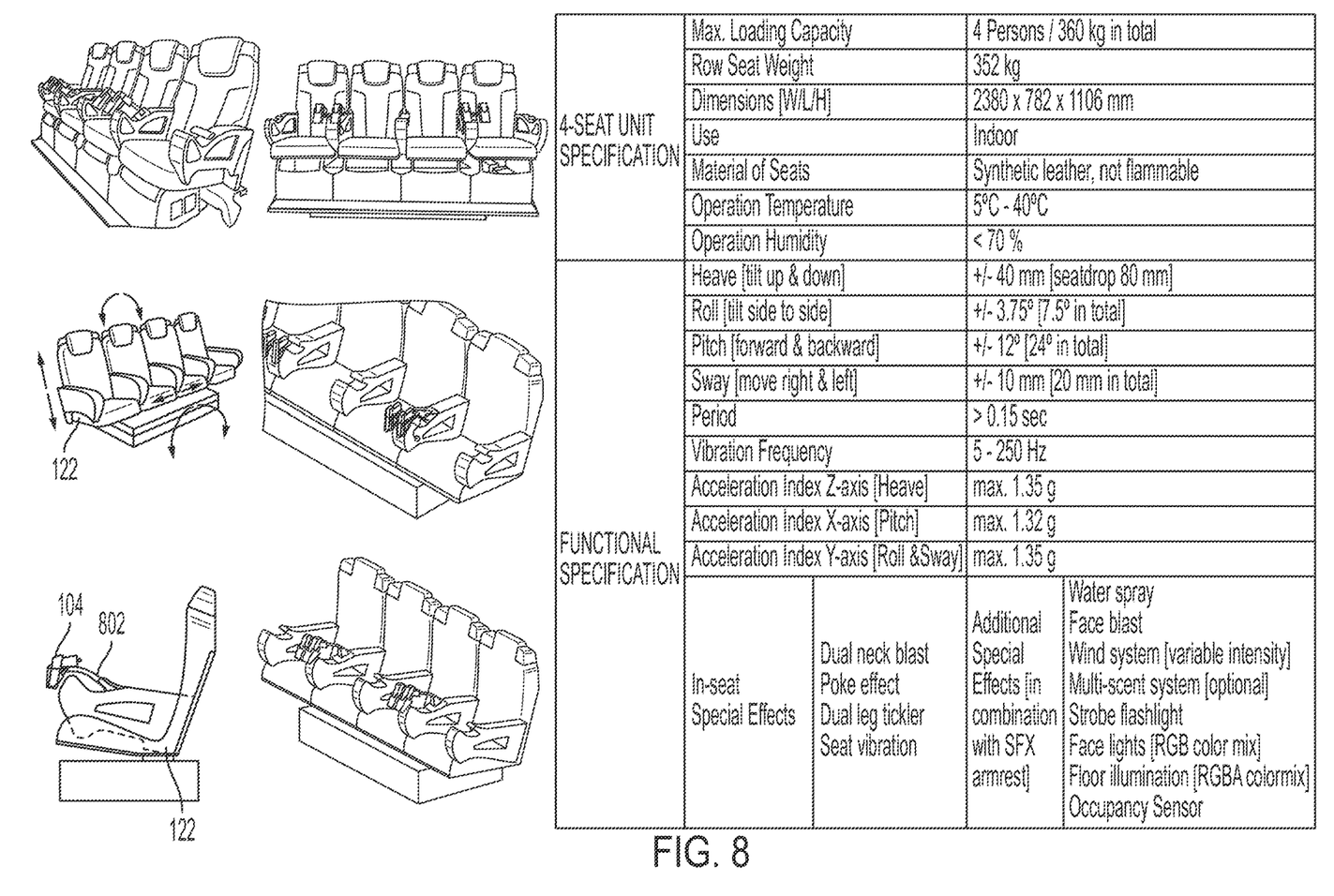
FIG. 8 depicts views of the multi-sensory seats of the interactive theater according to an embodiment of the invention.

FIG. 8 depicts multiple views of multi-sensory seats 122. As previously mentioned, each multi-sensory seat is coupled to seat switch 124 and receives seat control data and user audio uniquely tailored for each user. Each seat is preferably capable of multiple movement degrees of freedom in response to the seat control data, including, but not limited to, heave (up & down), roll (tilt side to side), pitch (tilt forward and backward), sway (move left and right), and vibration (e.g., 5-250 Hz). Each multi-sensory seat 122 is also capable of producing a variety of other sensory effects in accordance with the seat control data. Sensory effects can include, but are not limited to, air neck blast, a poke effect (back, legs, etc.), leg tickler, water spray, face blast, wind system (variable intensity), multi-scent system, strobe lights, face lights, face illumination, floor illumination. In some embodiments, each multi-sensory seat 122 is provided with one or more speakers in the vicinity of the head of the user for outputting user audio unique to each user. Further, each multi-sensory seat 122 preferably comprises an occupancy sensor so that IG PC 102 only produces seat control data and user audio for occupied seats.

Figure 9:
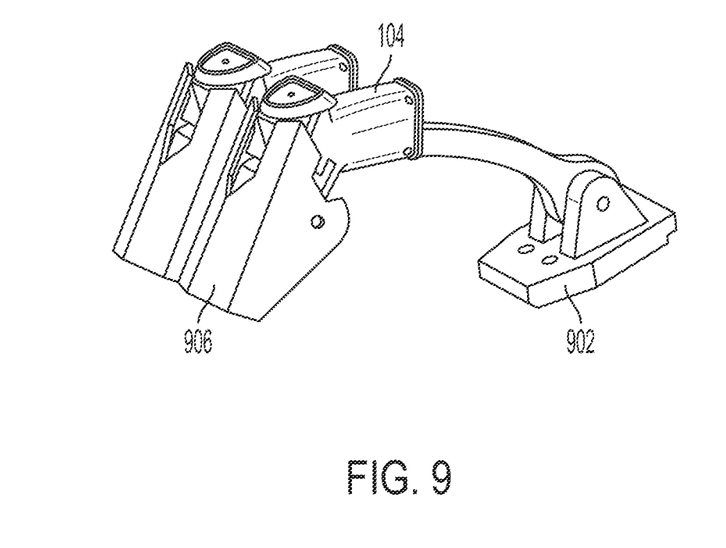
FIGS. 9 and 10 depict views of a sample input device.

Each multi-sensory seat 122 preferably comprises an input device holder 802 for holding input device 104 when not in use. An example input device holder 802 is depicted in FIG. 9. As shown, input device holder 802 comprises a bracket 902 which can be used to couple the input device holder 802 to a surface, such as an arm of multi-sensory seat 122. Sheath 906 contains an opening in which input device 104 is placed when not in use. The sheath depicted in FIG. 9 is similar to a holster and input device 104 has a form factor similar to a blaster or a gun.

Figure 10:
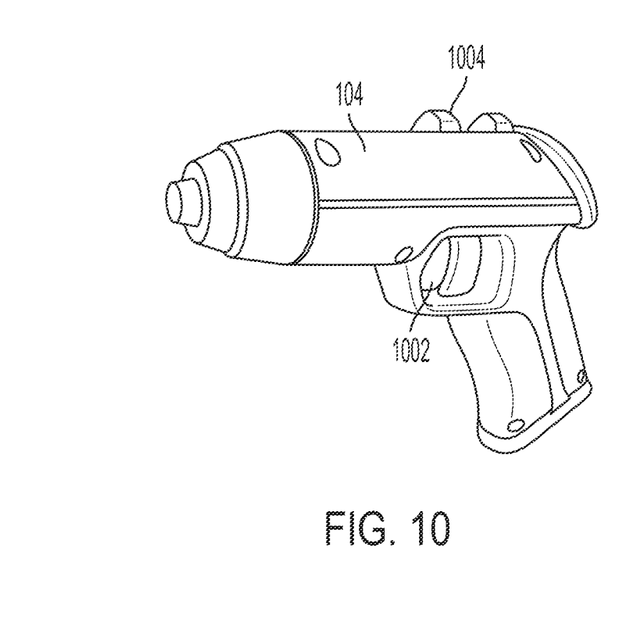

FIG. 10 depicts an example of an input device 104 in isolation. In this embodiment, input device 104 has the form of a gun with the main control being a trigger 1002. A user can point input device 104 at screen 112 during a shooter or blaster video game being produced, for example. The input device 104 preferably comprises motion sensors which may include, but are not limited to, an accelerometer, a gyroscope, a gravity sensor, rotation vector sensor, step count sensor, depth sensor, GPS, etc. Further a top of the housing of input device 104 comprises infrared camera 1004 for imaging IR light arrangement 402 as previously described. The motion sensor data and infrared camera data from each input device is provided to IG PC 102 in real time. This allows IG PC 102 to be aware of the precise location and orientation of each input device 104 in the theater 400. Further, this allows input device 104 to serve multiple functions (i.e., more than just a screen pointing device).

In particular, IR light arrangement 402 allows interactive theater system 100 to provide a unique, advanced targeting system providing accurate and persistent positional tracking that not only detects where users aim but how they move their controller. Because the tracking is very accurate, the input device can be used as multiple different in-game instruments such as a hammer, wand, shield, sword, gun, etc., in accordance with the story or the user's positioning of the device.

As already described, IG PC 102 is constantly aware of the location and position of each input device 104 being used in theater 400 (i.e., tracking 6DOF data). This allows the IG PC 102 to render the output of each user as if it is coming from their seat location and being directed toward the screen 112. For example, if a user used input device 104 as a rocket launcher, audio could be provided to multi-sensory seat 122 so that it sounds like the rocket originates from the user's seat. Further, IG PC 102 can adjust the trajectory of the rocket as it enters the virtual space shown on the display such that it appears as if the rocket originated at the user's seat instead of the center of the screen as occurs in most traditional shooters. This adds to the sense of realism and immersion for the user.

Other advanced effects are also possible using input device 104 because of its integrated motion sensors. For example, in the same scenario described above, a user could alter the course of the rocket left/right by moving the input device left/right or curving its position in space to represent the desired trajectory. Using this method, the user could hit enemies behind pillars/posts.

Thus, interactive theater system 100 provides an interactive 3D system that only requires 3D glasses for immersion. This allows users to be more aware of the actions and expressions of other users, which increases the feeling of comradery between players while still providing a tailored experience for each user.

The multiple input devices 104 can also be utilized to perform group actions since IG PC 102 has access to the real time movement of each. For example, if a portion of a video game required that a spaceship turn to avoid a collision, a certain predetermined number of users may be required to perform a certain action (e.g., move the input device 104 or rotate it left) to avoid the collision. Thus, input devices 104 can also be used to determine the outcome of group actions in the video game. As already explained, this feature is possible because each input device 104 is separately addressable and can be assigned to groups by IG PC 102.

Interactive theater system 100 can also track how input devices 104 are used or what percentage of people performed group actions and in what manner. This can be used to adjust future sensitivity required. For example, users may be required to tilt the input device 104 more or less to perform certain actions. This can be used to adjust sensitivity for new players or increase it for advanced players. In a gaming session with many participants, this adjustability can be used as a handicap to level the playing field between players. Further, interactive theater system 100 may have machine learning or AI capabilities to dynamically adjust the sensitivity for each player on the fly according to their strengths and weaknesses.

Figure 11:
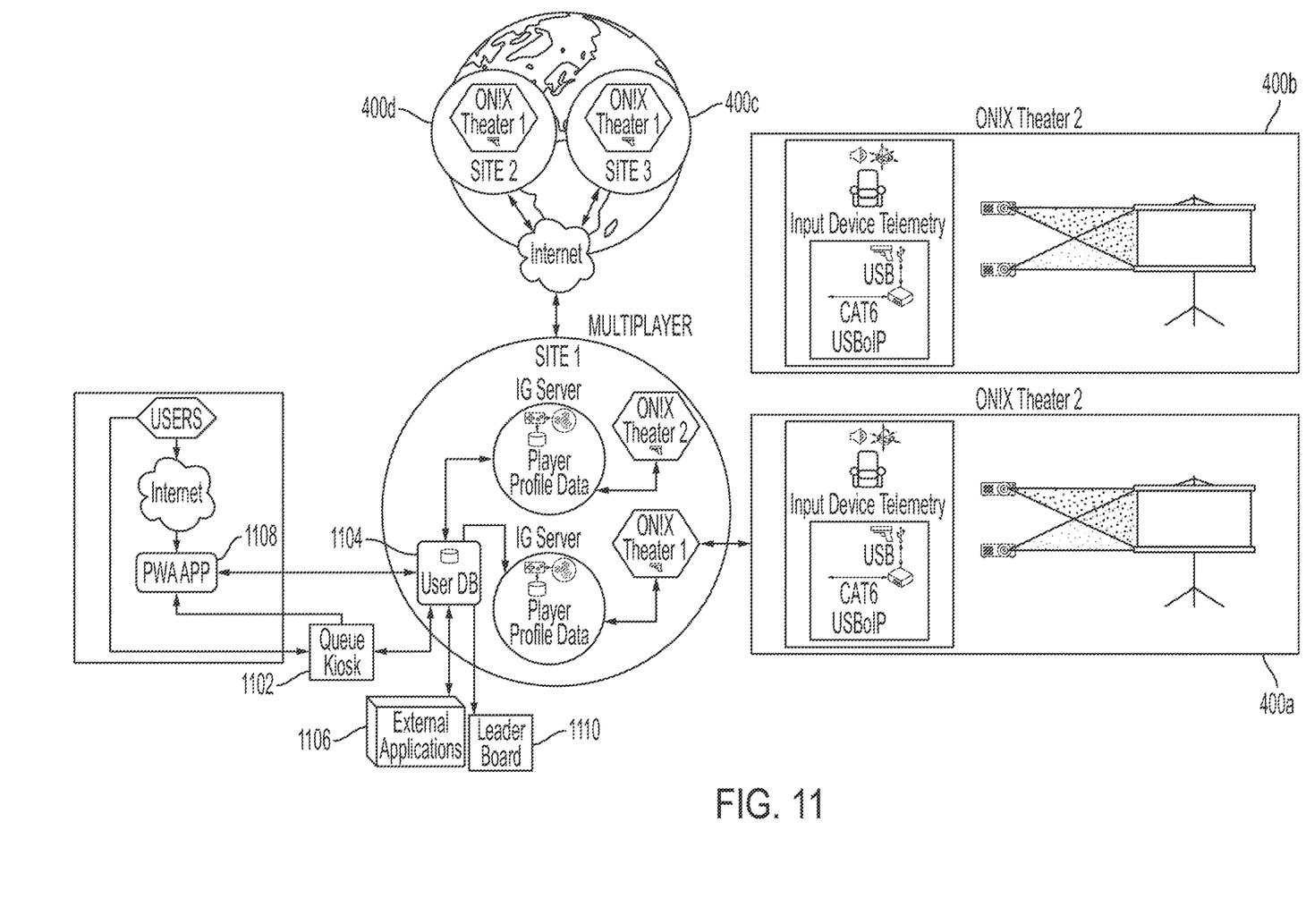
FIG. 11 depicts a network diagram showing the interconnection of a plurality of interactive theater systems.

FIG. 11 depicts a network diagram showing how multiple theaters 400a-400d can be in communication via the Internet or LAN. In the depicted embodiment, theaters 400a and 400b are geographically co-located at SITE 1. SITE 1 is in communication with theater 400c at SITE 3 and 400d at SITE 2. Because the program for each theater is executed by an IG PC 102, multiple theaters 400 can communicate in real time to allow the groups in each theater to participate in multi-player. This allows for a new type of gaming in which teams of players (using the same screen) can compete against other similar teams in one-time or league play. Each group can be provided with their own unique perspective inside the same theater 400 or even into another theater 400. In contrast, current gaming systems do not allow for such collaborative and interactive group play, with each user simultaneously and actively competing.

In some embodiments, users may register with interactive theater system 100 in advance and maintain an active user profile. When a user arrives at interactive theater system 100, they enter their information at kiosk 1102 which loads their profile from user database 1104. This allows each user to configure details about their profile or character ahead of time. For example, a user may choose a certain weapon type in advance for use with input device 104. This would then be loaded when the user checks in using kiosk 1102.

The user can also use their user profile in conjunction with other external applications 1106. For example, the interactive theater system 100 may be associated with a particular smartphone app 1106 or PWA app 1108. The user could interact with the smartphone app as their character and acquire unique weapons or other perks which could then be used in the interactive theater system 100 for particular games. Further, the user profile could be used by the user to check their current rankings, status, etc. Exemplary user profile systems compatible with the present invention are disclosed in U.S. Pat. No. 10,857,467, issued Dec. 8, 2020 and U.S. patent application Ser. No. 16/897,181, filed Jun. 9, 2020, the entire contents of which are hereby incorporated by reference in their entirety.

When the user enters the theater, the reader 126 on multi-sensory seat is used to identify the user sitting in the seat and any information from their user profile is loaded. The user's own cell phone with an NFC chip may be used to identify the user or a tag may be provided (e.g., carried on the user's keychain). It should be obvious that any type of technology capable of reading/identifying a user may be employed by interactive theater system 100 (e.g., card reader, RFID reader, NFC reader, barcode scanner, etc.).

However, it should be apparent that interactive theater system 100 can be used by users without user profiles. Those users would instead use kiosk 1102 to register and then be assigned a multi-sensory seat 122 for a gaming session.

SITE 1 may further incorporate a leaderboard 1110 to keep track of user and team statistics daily, weekly, etc. Or, in a tournament mode, leaderboard 1110 can be utilized to track the progress of each team or individual through the tournament. The operator can even use the microphone to act as an announcer or real time commentary, similar to commentators in traditional sporting events.

The invention claimed is:

1. An interactive theater system comprising:
   an interactive gaming computer (IG PC) configured to execute an interactive multi-player video game;
   a display system for receiving and displaying a video stream received from the IG PC;
   a plurality of multi-sensory seats for providing multi-sensory feedback to players during execution of the interactive multi-player video game;
   an infrared light arrangement positioned above the plurality of multi-sensory seats;
   at least one input device associated with each multi-sensory seat of the plurality of multi-sensory seats for providing user input from the players;
   wherein each input device comprises:
       at least one motion sensor for tracking an orientation and position of the input device; and
       an infrared camera for imaging the infrared light arrangement,
   wherein the IG PC receives infrared camera data from the infrared cameras for real-time tracking of each input device.

2. The interactive theater system according to claim 1, further comprising:
   an environmental audio system for outputting environmental audio; and
   a lighting system for outputting environmental lighting.

3. The interactive theater system according to claim 1, wherein the IG PC further receives motion sensor information from the at least motion sensor of each input device,
   wherein the IG PC utilizes the motion sensor information for tracking the input device if infrared camera data is not available from an input device.

4. The interactive theater system according to claim 1, wherein the multi-sensory feedback comprises seat control data and sensory effect data.

5. The interactive theater system according to claim 4, wherein the seat control data includes instructions for causing the multi-sensory seat to move up and down, tilt side to side, tilt forward and backward, move left and right, and vibrate according to instructions received from the IG PC.

6. The interactive theater system according to claim 4, wherein the sensory effect data includes instructions for causing the multi-sensory seat to produce an air neck blast, a poke effect, a leg tickler effect, a water spray, a face blast, a multi-scent output, face light illumination, or floor illumination.

7. The interactive theater system according to claim 4, wherein the seat control data and sensory effect data for each player is responsive to execution of the interactive multi-player video game and real-time input received from the player via the input device.

8. The interactive theater system according to claim 1, wherein the display system comprises:
   at least one 3D projector; and
   a screen for displaying the output of the 3D projector.

9. The interactive theater system according to claim 8, wherein the screen is curved.

10. The interactive theater system according to claim 1, further comprising:
    a second interactive theater system in communication with the interactive theater system,
    wherein the second interactive theater system executes the interactive multi-player interactive video game at a same time as the interactive theater system for allowing they players of the interactive theater system to compete against second players of the second interactive theater system in real-time.

11. The interactive theater system according to claim 10, wherein the second interactive theater system has a same configuration as the interactive theater system.

12. An interactive theater system comprising:
    an interactive gaming computer (IG PC) configured to execute an interactive multi-player video game;
    a display system for receiving and displaying a video stream received from the IG PC;
    a plurality of multi-sensory seats for receiving effect data from the IG PC to provide multi-sensory feedback to players during execution of the interactive multi-player video game;
    an infrared light arrangement positioned above the plurality of multi-sensory seats;
    at least one input device associated with each multi-sensory seat of the plurality of multi-sensory seats,
    wherein each input device comprises:
        at least one motion sensor for tracking an orientation and position of the input device; and
        an infrared camera for imaging the infrared light arrangement
    a tracking system for tracking a real-time three-dimensional location of each input device within the interactive theater system;
    wherein the IG PC groups a first plurality of multi-sensory seats into a first group, and
    wherein the IG PC provides group event data to the first group to output group multi-sensory feedback through the first plurality of multi-sensory seats, and
    wherein the IG PC provides different individual event data each multi-sensory seat of the first group, and
    wherein the IG PC receives infrared camera data from the infrared cameras for real-time tracking of each input device.

13. The interactive theater system according to claim 12, further comprising
    an environmental audio system comprising a plurality of audio components for outputting environmental audio; and
    a lighting system comprising a plurality of lighting elements for outputting environmental lighting;
    wherein the plurality of audio components and the plurality of lighting elements are individually addressable by the IG PC.

* * * * *